(12) United States Patent
Zhou et al.

(10) Patent No.: US 8,813,001 B2
(45) Date of Patent: Aug. 19, 2014

(54) SYSTEM AND METHOD FOR EFFICIENT AND OPTIMAL MINIMUM AREA RETIMING

(75) Inventors: Hai Zhou, Glenview, IL (US); Jia Wang, Chicago, IL (US)

(73) Assignee: Northwestern University, Evanston, IL (US)

( * ) Notice: Subject to any disclaimer, the term of this patent is extended or adjusted under 35 U.S.C. 154(b) by 753 days.

(21) Appl. No.: 12/361,845

(22) Filed: Jan. 29, 2009

(65) Prior Publication Data

US 2009/0199146 A1    Aug. 6, 2009

Related U.S. Application Data

(60) Provisional application No. 61/025,548, filed on Feb. 1, 2008.

(51) Int. Cl.
*G06F 17/50* (2006.01)

(52) U.S. Cl.
USPC ........... 716/100; 716/105; 716/106; 716/108; 716/111; 716/113; 716/122; 716/123; 716/132; 716/134; 716/136

(58) Field of Classification Search
USPC ......... 716/106, 108, 111, 113, 122, 123, 132, 716/134, 136
See application file for complete search history.

(56) References Cited

U.S. PATENT DOCUMENTS

| | | | |
|---|---|---|---|
| 5,392,430 A * | 2/1995 | Chen et al. | 718/102 |
| 5,442,563 A * | 8/1995 | Lee | 700/104 |
| 5,502,647 A * | 3/1996 | Chakradhar et al. | 716/132 |
| 7,120,883 B1 * | 10/2006 | van Antwerpen et al. | 716/102 |
| 7,200,822 B1 | 4/2007 | McElvain | |
| 7,203,919 B2 * | 4/2007 | Suaris et al. | 716/108 |
| 7,296,246 B1 | 11/2007 | Kuehlmann et al. | |
| 7,350,166 B2 * | 3/2008 | Baumgartner et al. | 716/103 |
| 7,366,652 B2 * | 4/2008 | Wang et al. | 703/28 |
| 7,516,139 B2 * | 4/2009 | Ziemann et al. | 1/1 |
| 7,624,364 B2 * | 11/2009 | Albrecht et al. | 716/113 |
| 7,743,354 B2 * | 6/2010 | Albrecht et al. | 716/113 |
| 7,917,874 B2 * | 3/2011 | Baumgartner et al. | 716/105 |
| 7,945,880 B1 * | 5/2011 | Albrecht et al. | 716/105 |
| 8,423,939 B1 * | 4/2013 | Hurst | 716/114 |
| 2004/0221249 A1 * | 11/2004 | Lahner et al. | 716/4 |
| 2008/0235637 A1 * | 9/2008 | Baumgartner et al. | 716/4 |
| 2010/0102825 A1 * | 4/2010 | Bushnell et al. | 324/537 |
| 2010/0115477 A1 * | 5/2010 | Albrecht et al. | 716/2 |

OTHER PUBLICATIONS

Sapatnekar et al.; "Utilizing the retiming-skew equivalence in a practical algorithm for retiming large circuits"; Publication Year: 1996; Computer-Aided Design of Integrated Circuits and Systems, IEEE Transactions on; vol. 15 , Issue: 10 pp. 1237-1248.*

(Continued)

*Primary Examiner* — Helen Rossoshek
(74) *Attorney, Agent, or Firm* — Klintworth & Rozenblat IP LLC

(57) ABSTRACT

A method for use in electronic design software efficiently and optimally produces minimized or reduced register flip flop area or number of registers/flip flops in a VLSI circuit design without changing circuit timing or functionality. The method dynamically generates constraints; maintains the generated constraints as a regular tree; and incrementally relocates registers/flip flops and/or the number of registers/flip flops in the circuit design.

26 Claims, 7 Drawing Sheets

```
                    Algorithm iMinArea
Inputs
        φ: the clock period
Outputs
        The optimal feasible retiming r for φ
1    Initialize a feasible retiming r under clock period φ
2    Initialize F to be a forest with no edge.
3    Loop:
4        I ← V_F(r)
5        If I = φ:
6            Stop, r is optimal.
7        Else if w_r(u, v) = 0 for an edge (u, v) leaving I:
8            UpdateForest(F,u,v).
9        Else if t(v) > φ in r, for some vertex v:
10           UpdateForest(F,q(v),v).
11       Else:
12           r ← r_I.
```

(56) References Cited

OTHER PUBLICATIONS

Wang et al.; "An efficient incremental algorithm for min-area retiming"; Publication Year: 2008; Design Automation Conference, 2008. DAC 2008. 45th ACM/IEEE; pp. 528-533.*

Lalgudi et al.; "Retiming edge-triggered circuits under general delay models"; Publication Year: 1997; Computer-Aided Design of Integrated Circuits and Systems, IEEE Transactions on; vol. 16, Issue: 12; pp. 1393-1408.*

Baumgartner et al.; "Min-area retiming on flexible circuit structures"; Publication Year: 2001; Computer Aided Design, 2001. ICCAD 2001. IEEE/ACM International Conference on; pp. 176-182.*

Sundararajan et al.; "Marsh:min-area retiming with setup and hold constraints"; Publication Year: 1999; Computer-Aided Design, 1999. Digest of Technical Papers. 1999 IEEE/ACM International Conference on; pp. 2-6.*

Hurst, et al.; "Scalable min-register retiming under timing and initializability constraints "; Publication Year: 2008; Design Automation Conference, 2008. DAC 2008. 45th ACM/IEEE; pp. 534-539.*

Maheshwari et al.; "Minimum area retiming with equivalent initial states"; Publication Year: 1997; Computer-Aided Design, 1997. Digest of Technical Papers., 1997 IEEE/ACM International Conference on; pp. 216-219.*

Jia Wang et al.; "An efficient incremental algorithm for min-area retiming"; Publication Year: 2008 Design Automation Conference, 2008. DAC 2008. 45th ACM/IEEE pp. 528-533.*

Lin et al.; "Optimal wire retiming without binary search"; Publication Year: 2006; Computer-Aided Design of Integrated Circuits and Systems, IEEE Transactions on; vol. 25, Issue: 9; pp. 1577-1588.*

International Search Report and the Written Opinion of the International Searching Authority in International Application No. PCT/US2009/032810.

* cited by examiner

| | |
|---|---|
| 1 | Find a feasible retiming $r$ under clock period $\phi$ |
| 2 | $\mathcal{A} \leftarrow \phi$. |
| 3 | Loop: |
| 4 | Find a positive vertex set $I$ closed under $\mathcal{A}$ |
| 5 | If no such $I$ exists: |
| 6 | Stop, $r$ is optimal. |
| 7 | Else if $w_r(u, v) = 0$ for an edge $(u, v)$ leaving $I$: |
| 8 | Add $(u, v)$ to $\mathcal{A}$. |
| 9 | Else if $t(v) > \phi$ in $r_I$ for some vertex $v$: |
| 10 | Add $(q(v), v)$ to $\mathcal{A}$. |
| 11 | Else: |
| 12 | $r \leftarrow r_I$; update $\mathcal{A}$. |

FIG. 1

| | Subroutine UpdateRoot |
|---|---|
| | Inputs |
| | $\mathcal{F}$: a regular forest $v$: a vertex |
| | Outputs |
| | Updated $\mathcal{F}$ where $v$ is the root of the tree. |
| 1 | Let $(v_0, v_1, .., v_I)$ with $v_I = v$ be the path from the root of the tree containing $v$ to $v$ in $\mathcal{F}$ |
| 2 | Fox $i = 1$ to $I$: |
| 3 | $b_T \leftarrow \mathcal{B}(v_{i-1})$   $\mathcal{B}(v_{i-1}) \leftarrow \mathcal{B}(v_{i-1}) - \mathcal{B}(v_i)$ |
| 4 | CreateTree$(\mathcal{F}, v_i)$ |
| 5 | If $b_T > 0) \wedge \mathcal{U}(v_i) \wedge (\mathcal{B}(v_{i-1}) > 0)$ or $b_T < 0) \wedge \neg \mathcal{U}(v_i) \wedge (\mathcal{B}(v_{i-1}) < 0)$: |
| 6 | Continue, |
| 7 | MergeTree$(\mathcal{F}, v_i, v_{i-1})$, $\mathcal{B}(v_i) \leftarrow b_T$ $\mathcal{U}(v_{i-1}) \leftarrow \neg \mathcal{U}(v_i)$. |

FIG. 4

| | Subroutine UpdateForest |
|---|---|
| | Inputs |
| | $\mathcal{F}$: a regular forest |
| | $u$: a vertex belongs to $\mathcal{V}_{\mathcal{P}(\mathcal{F})}$ |
| | $v$: a vertex does not belongs to $\mathcal{V}_{\mathcal{P}(\mathcal{F})}$ |
| | Outputs |
| | Updated regular forest $\mathcal{F}$ with $(u,v)$ added to $\mathcal{A}(\mathcal{F})$. |
| 1 | ChangeRoot$(\mathcal{F},v)$ |
| 2 | If $\mathcal{B}(v) = 0$: |
| 3 | MergeTree$(\mathcal{F}, u, v)$, $\mathcal{U}(v) \leftarrow$ false. |
| 4 | Else:// must have $\mathcal{B}(v) < 0$ |
| 5 | ChangeRoot$(\mathcal{F},u)$ |
| 6 | $b_T \leftarrow \mathcal{B}(u) + \mathcal{B}(v)$. |
| 7 | MergeTree$(\mathcal{F}, u, v)$, $\mathcal{B}(u) \leftarrow b_T$, $\mathcal{U}(v) \leftarrow$ false |
| 8 | ZeroCut$(\mathcal{F}, u, b_T)$. |

FIG. 5

| | Subroutine ZeroCut |
|---|---|
| Inputs | |
| $\mathcal{F}$: | a forest. |
| $u$: | a vertex in an almost regular tree $\mathcal{T}$ |
| $b_\mathcal{T}$: | equals to $b(\mathcal{T})$. |
| Outputs | |
| Updated forest $\mathcal{F}$ where the subtree of $\mathcal{T}$ rooted at $u$ becomes a set of regular trees. | |
| 1 | For each child $v$ of $u$: |
| 2 | If $\neg \mathcal{U}(v) \wedge (b_\mathcal{T} \leq 0) \wedge \mathcal{B}(v) = 0)$ or $\mathcal{U}(v) \wedge (b_\mathcal{T} \geq 0) \wedge \mathcal{B}(v) = 0)$: |
| 3 | CreateTree($\mathcal{F},v$). |
| 4 | ZeroCut($\mathcal{F},v,0$) |
| 5 | Else: |
| 6 | *ZeroCut($\mathcal{F},v,b_\mathcal{T}$)*. |

FIG. 6

```
                    Algorithm iMinArea
Inputs

ϕ: the clock period

Outputs

The optimal feasible retiming r for ϕ

1      Initialize a feasible retiming r under clock period ϕ

2      Initialize $\mathcal{F}$ to be a forest with no edge.

3      Loop:

4          $I \leftarrow \mathcal{V}_{\mathcal{P}(\mathcal{F})}$

5          If $I = \phi$:

6              Stop, r is optimal.

7          Else if $w_r(u, v) = 0$ for an edge (u, v) leaving I:

8              UpdateForest($\mathcal{F}, u, v$).

9          Else if $t(v) > \phi$ in $r_I$ for some vertex v:

10             UpdateForest($\mathcal{F}, q(v), v$).

11         Else:

12             $r \leftarrow r_I$.
```

FIG. 7

SYSTEM AND METHOD FOR EFFICIENT AND OPTIMAL MINIMUM AREA RETIMING

STATEMENT REGARDING FEDERALLY SPONSORED RESEARCH OR DEVELOPMENT

This work was supported by the National Science Foundation (NSF) Grant No. CCR-0238484.

CROSS-REFERENCE TO RELATED APPLICATIONS/INCORPORATION BY REFERENCE

This patent application makes reference to, claims priority to and claims benefit from U.S. Provisional Patent Application Ser. No. 61/025,548 filed on Feb. 1, 2008. The above stated provisional application is hereby incorporated herein by reference in its entirety.

FIELD OF THE INVENTION

The present invention relates to a system and method for use in electronic design software to perform minimum area retiming to relocate registers or flip-flops in a circuit design through sequential transformation wherein circuit functionality is preserved and more particularly to such a retiming system and method that is optimal, efficient and minimizes memory usage.

BACKGROUND OF THE INVENTION

Retiming is one of the most powerful sequential transformations that relocates the registers or flip-flops (FFs) in a circuit while preserving its functionality. Since relocating the FFs could balance the longest combinational paths and reduce the circuit states, the clock period and the FF area or number of FFs in a circuit can be reduced through retiming optimizations. As the minimum clock period retiming minimizes the clock period, and thus might significantly increase the FF area, the minimum area retiming minimizes the FF area under a given clock period, and thus could be used to minimize the FF area even under the minimum clock period. Therefore, the min-area retiming problem is more important for sequential circuit design, but of higher complexity. See, e.g. N. Shenoy and R. Rudell, "Efficient implementation of retiming" ICCAD, pages 226-233 (1994).

All known and provable approaches to min-area retiming follow the basic ideas of C. E. Leiserson and I. B. Saxe "Retiming synchronous circuitry," Algorithmica 6(1):5-35 (1991). Given a circuit represented as a graph of n vertices and m edges, the minimum number of FFs between any two vertices and the maximum delay over the paths of the minimum number of FFs are first computed. Then, besides one constraint for each edge requiring that the FF number to be nonnegative, for each pair of the vertices whose computed path delay is larger than the given clock period, i.e. the timing critical path, a constraint is generated requiring that there be at least one FF between them. Minimizing the FF' area under those constraints formulates a dual of the min-cost network flow problem. Since each constraint forms an arc in the flow network, the number of arcs in the network is usually $\theta(n^2)$. Even though polynomially solvable, min-cost network flow computation, such as described in R. K. Ahuja, T. L. Magnanti, and J. B. Orlin "Network Flows: Theory, Algorithms, and Application," Prentice Hall (1993), over a dense circuit graph is usually expensive on large problems.

N. Shenoy and R. Rudell, in "Efficient implementation of retiming," ICCAD, pages 226-233 (1994), were among the first to consider a practical implementation of the min-area retiming algorithm. They found that the storage requirement to compute the timing critical paths and the number of constraints are the bottleneck and proposed techniques to reduce memory usage and to prune some redundant constraints. Minaret, proposed by N. Maheshwari and S S. Sapatnekar in "Efficient retiming of large circuits," IEEE TVLSI, 6(1):74-83, (March 1998), further pruned redundant constraints to reduce the size of the flow network by exploring the equivalence of retiming and clock skew optimization as proposed in ASTRA. See S. S. Sapatnekar and R. B Deokar "Utilizing the retiming-skew equivalence in a practical algorithm for retiming large circuits," IEEE TCAD, 15(10):1237-1248 (October 1996). However, even with these pruning techniques, as experimental results indicate, the flow networks could still be very dense compared to the original circuit graphs. Experiments have shown that for a circuit with more than 180K gates Minaret had to formulate and solve a minimum cost network flow problem with more than 122M arcs, which used up more than 2 GB of virtual memory.

H. Zhou, in "Deriving a new efficient algorithm for min-period retiming," Asia and South Pacific Design Automation Conference, Shanghai, China (January 2005) proposed an efficient incremental algorithm for minimum period retiming that iteratively moves FFs to decrease the clock period while the optimal solution is found in a short time. To overcome the expenses of existing approaches to minimum area retiming, D. P. Singh, V. Manohararajah, and S D Brown, in "Incremental retiming for FPGA physical synthesis," DAC, pages 433-438, Anaheim, Calif. (June 2005) also proposed that FFs be incrementally moved in the circuit. However, since only those moves that are better in cost and feasible in timing are allowed, these approaches are heuristic and may end up with a suboptimal solution. An efficient incremental algorithm for minimum area retiming with provably optimal solution has been evasive.

BRIEF SUMMARY OF THE INVENTION

In accordance with the present invention the disadvantages of prior retiming methods has been overcome. The method of retiming registers or flip flops in a circuit design in accordance with the present invention performs minimum area retiming to relocate the registers/flip flops in a circuit design in an efficient and optimal manner.

More particularly, the method of the present invention dynamically generates constraints; maintains the constraints as a regular forest; and incrementally relocates registers in the circuit to reduce the register area in the circuit and/or the number of registers in the circuit.

In accordance with one embodiment of the present invention the method includes determining whether there is a cluster of gates in the circuit wherein each gate of the cluster has a number of fanouts that is greater than the number of fanins of the gate and relocating the flip flops by iteratively moving a flip flop over the cluster.

In accordance with another embodiment of the present invention a constraint is generated only if it is directed to a path in the circuit that can lead to a reduction in the register area and/or number of registers in the circuit.

These and other advantages and novel features of the present invention, as well as details of an illustrated embodiment thereof, will be more fully understood from the following description and the drawings.

BRIEF DESCRIPTION OF SEVERAL VIEWS OF THE DRAWINGS

FIG. 1 is an illustration of a software routine for incremental minimum area retiming in accordance with one embodiment of the present invention;
FIG. 4 is an illustration of a subroutine ChangeRoot;
FIG. 5 is an illustration of a subroutine UpdateForest;
FIG. 6 is an illustration of a subroutine ZeroCut;
and
FIG. 7 is an illustration of a software routine for optimal, incremental minimum area retiming in accordance with another embodiment of the present invention.

DETAILED DESCRIPTION OF THE INVENTION

Figure 2:
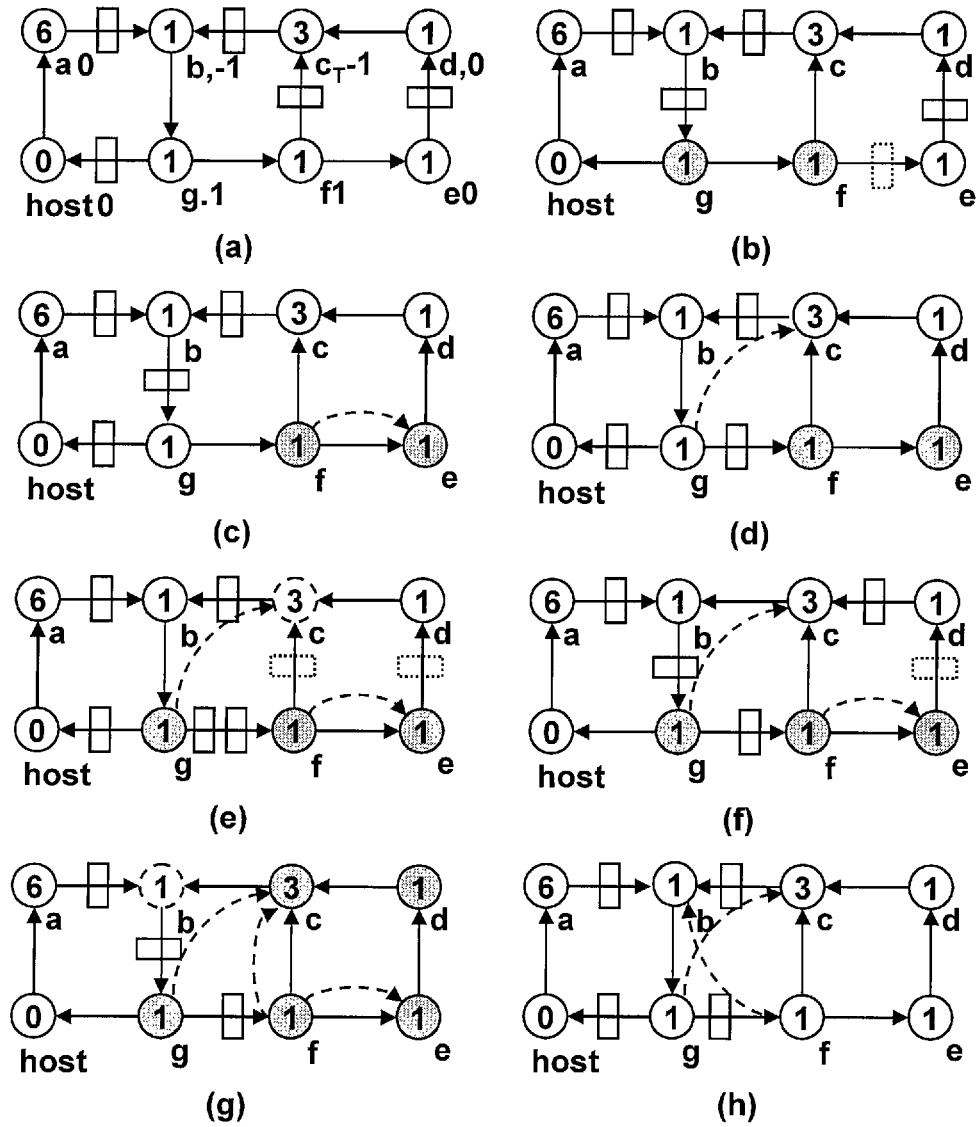
FIGS. 2a-2h are illustrations of the iterative retiming of a circuit represented as a graph of vertices and edges in accordance with the routine of FIG. 1.

A synchronous sequential circuit is modeled by a directed graph $G=(V,E)$ whose vertices V represent combinational gates and whose edges E represent signals between vertices. Nonnegative gate delays are given as vertex weights $d: V \to R^*$ and the nonnegative numbers of FFs on the signals are given as edge weights $w': E \to N$. Given such a graph, the min-area retiming problem asks for an FF relocation $w': E \to N$ such that the total FF area in the circuit is minimized while it works under a given clock period $\phi$.

Conventionally, to guarantee that $w'$ is a relocation of $w$, a retiming is given by a vertex labeling $r: V \to Z$ representing the number of FFs moved backward over each gate from fanouts to fanins. Given $r$, the FF number on the edge $(u, v)$ after retiming is $w_r(u,v)=w(u,v)+r(v)-r(u)$. A retiming $r$ is valid if the FF number of every edge is nonnegative, $$P0(r): (\forall (u,v) \in E: w_r(u,v) \geq 0)$$

For a circuit to work under a given clock period $\phi$, the maximum combinational path delay in the circuit can be at most $\phi$. To compute the maximum path delay, a vertex labeling of $t: V \to R$ is used to represent the arrival time at the output of each gate. A valid $r$ retiming $r$ is feasible for $\phi$ if the following condition holds for some arrival times $t$, $$P1(r,\phi): (\forall (u,v) \in E: (w_r(u,v) > 0) \vee (t(v) \geq d(v)+t(u)))^\wedge$$
$$(\forall v \in V: d(v) \leq t(v) \leq \phi).$$

The total FF number is $\Sigma_{e \in E(G)} wr(e)$. For any vertex $v \in V$, let $FI(v)$ and $FO(v)$ be the sets of the fanins and the fanouts of $v$ respectively. To minimize, the total FF number is equivalent to maximizing the quantity $\Sigma_{v \in V}(|FO(v)|-|FI(v)|)r(v)$. More generally, $b: V \to R$ is defined to be the labeling that represents the reduction in FF area if one FF is moved from the fanouts of the given vertex to its fanins. Then the FF area reduction for the retiming $r$ is $\Sigma_{v \in V(G)} b(v) r(v)$. With these notations, the min-area retiming problem can be formally stated as follows.

| Maximize | $\Sigma b(v) r(v)$, |
| --- | --- |
|  | $\Sigma b(v) r(v)$, |
|  | $v \in V(G)$ |
| st | $P0(r) \wedge P1(r, \phi)$ |

For ease of presentation, $b$ is extended to any graph $X=(V_{X1}E_x)$ with $V_X \subseteq V$ and any $I \subseteq V$ by defining $b(X)$ that $b(X) \triangleq \Sigma^{v \in v_s} b(v)$, $b(I) \triangleq \Sigma^{v \in I}$ and $b(\phi) \triangleq 0$. It is assumed that $b(G)=0$ without loss of generality and that the min-area retiming problem is bounded.

More complicated retiming problems can be solved in the same formulation of the problem stated above. One example is to consider the sharing of the FFs at the fanouts of a gate. As proposed by C. E. Leiserson and I. B Saxe in "Retiming synchronous circuitry," *Algorithmica*, 6(1):5-35 (1991), this scenario is handled by including additional constraints in $P0(r)$ and setting the labeling $b$ accordingly Let $wmax(u) = max_{(u,v) \in E} w(u, v)$ and assume that all the fanout edges of $u$ have the same breadth $B(u)$, which is the costs of adding a FF along each edge. For each vertex $u$ where the FFs at the fanouts of $u$ should be shared, a dummy vertex $u_m$ is introduced For each fanout $v$ of $u$, the breadth of the edge $(u, v)$ is changed to $$\frac{\beta(u)}{|FO(u)|}$$

and one constraint is added to $P0(r)$ by introducing the edge $(v, u_m)$ to G with $w(v, u_m) = wmax(u) - w(u, v)$ and the breadth $$\frac{\beta(u)}{|FO(u)|}$$

In Leiserson and Saxe's approach to the minimum-area retiming, two $n \times n$ matrices W and D are first computed to capture the critical timing constraints, and based on them, a dual of the min-cost network flow problem is formulated and solved. For any vertex pair $(u, v)$, $W(u, v)$ is the minimum number of FFs along any path from $u$ to $v$, and $D(u,v)$ is the maximum delay of the paths from $u$ to $v$ with $W(u, v)$ FFs. If $D(u,v) > \phi$, then there is a timing critical path from $u$ and $v$ and a critical timing constraint requiring at least one FF on the path should be generated. The dual of the minimum cost network flow problem is formulated to maximize the FF area reduction subject to the nonnegative FF number requirement and all the critical timing constraints. As W and D would usually be much denser than the circuit graph, the flow network would be dense when the given clock period is tight. Despite the many efforts as described in N. Shenoy and R. Rudell, "Efficient implementation of retiming," ICCAD, pages 226-233 (1994) and N. Maheshwari and S S. Sapatnekar, "Efficient retiming of large circuits," *IEEE TVLSI*, 6(1):74-83 (March 1998) to reduce the storage requirement for computing the critical timing constraints and to prune the redundant constraints, the large number of constraints is still the bottleneck for solving the min-area retiming problems.

To totally avoid the bottleneck, the method of the present invention does not compute the matrices W or D at all. The feasibility of clock period $\phi$ is checked by dynamically updating the gate arrival times and comparing them with $\phi$, as in C. E. Leiserson and I. B Saxe "Retiming synchronous circuitry" *Algorithmica*, 6(1):5-35 (1991) and H. Zhou "Deriving a new efficient algorithm for min-period retiming," *Asia and South Pacific Design Automation Conference*, Shanghai, China (January 2005). The objective in the retiming problem stated above indicates that, in order to improve a given solution, some vertices with $b>0$ must have their $r$ increased. However, a vertex may not be independent if $w_r(u, v)=0$ and increasing $r(u)$ requires that $r(v)$ be increased at the same time. It is not hard to maintain such a relation. However, a more involved case happens when the increase of $r$ over a path extends it to be longer than φ. Incremental arrival time updating is used to identify such a situation, and the relation between the source u and sink v of the violating path is maintained as a constraint. It is revealing to note that D(u, v)>φ and r(v)+W(u, v)−r (i)=1 for such u and v. In other words, the method of the present invention dynamically identifies timing arcs in Leiserson and Saxe's flow network but only identifies the currently tight ones that "lie on the road to improvement." The relations thus identified on normal circuit edges and on tight timing arcs are called active constraints. They force vertices with b(I)>0 to be bundled with vertices with b<0. When there is still a bundle I with b(I)>0, the objective can be improved by increasing r on I; otherwise, the current retiming is already optimal.

FIG. 1 depicts the incremental minimum area retiming method of the present invention that is implemented as a software routine by at least one processor of a computer system having preferably 65 MB of memory. The method is used for sequential circuit design to relocate the registers or FFs in a circuit to reduce the register or FF area and/or number of registers or FFs in the circuit. The method of the present invention directly addresses the register or FF area minimization problem instead of its dual network flow problem. The method starts by finding a feasible retiming r for the clock period φ wherein a set of active constraints A are maintained throughout the algorithm. An initial feasible retiming r to obtain a minimum clock period φ on line 1 of the method can be obtained by any efficient fixed period retiming algorithm such as described in C. E. Leiserson and I. B. Saxe "Retiming Synchronous Circuitry," *Algorithmica*, 6(1):5-35 (1991) or H. Zhou "Deriving A New Efficient Algorithm For Min-Period Retiming," *Asia and South Pacific Design Automation Conference*, Shanghai, China (January 2005). After the initial circuit design satisfying the clock period constraint is found at line 1, the method implements a loop to iteratively reduce the number of registers/FFs by moving the registers/FFs backwards over some gates with fanouts larger than fanins. If a fanout edge currently has no register/FF or is on a timing critical path requesting at least one register/FF, such a move may require register/FF moves over other gates. The method of the present invention maintains such relations among the gates, i.e. constraints, as a forest. If there is a cluster of gates, i.e., vertices whose fanouts are larger than its fanins, the number of FFs can be reduced by moving one FF over the cluster and if not, the current design is optimal. An important advantage of the method is that a critical timing constraint is dynamically generated only when it is needed. Because the method maintains a forest on the gates, it only requests linear storage on top of the circuit graph. The method is extremely efficient in handling large circuits. For example, for a circuit design having more than 180K gates, the method of the present invention provided optimal retiming with a 65 MB memory in less than one minute. As such the method was at least 100 times faster than the prior art Minaret method and it used 1/30$^{th}$ of the memory used by Minaret.

More specifically, as shown in FIG. 1, after a feasible retiming r under clock period φ is found, the first step of the loop at line 4 is to find a positive vertex set I that is closed under the set of active constraints A. If no such I exists, the loop stops and r is determined to be optimal. A vertex set I is closed under active constraints A if A if ∀(u, v) ∈ A, u ∈ I ⇒ ∈ I. A vertex set I is positive if b(I)>0 so that the increment of r on I will reduce the FF area. The new retiming after the increment is denoted by $r_I$. However, if such an increase violates the nonnegative FF number requirement on an edge leaving I as determined at line 7, an active constraint (u,v) is added to A in line 8 of the method. An increase can also violate the timing constraint if a path longer then φ is created.

The method uses incremental arrival time updating to identify such a situation and keeps a relation between the source u and sink v of the violating path wherein (D(u, v)>φ and r(v)+W(u, v)−r (u)=1 for such u and v. As such, the method of the present invention dynamically identifies timing arcs that lie on the road to improvement in a flow network. More particularly, q(v) is used to record the source of the critical path to v. If t(v)>φ in $r_I$ for some vertex v as determined at line 9, then the method adds an active constraint (q(v), v) to A at line 10. If a positive vertex set I is found at line 4 that will not generate more active constraints, the FF area is reduced by increasing r on I and updating A at line 12. If because of the increase in active constraints in set A, there is no positive I closed under A, then the retiming r is determined to be optimal at line 6.

FIG. 2 illustrates an example of the incremental minimum area retiming of a circuit in accordance with the method of FIG. 1, wherein the labeling b is shown in FIG. 2a after the gate names and the gate delays are inside of each gate. In this example, the clock period is 6. Active constraints are shown as dotted arcs in FIG. 2. Moreover, one FF is moved from the fanouts of the gates shaded gray to their fanins. Detailed execution information is listed in the following Table.

| A, I | Comments |
|---|---|
| 1. φ, {g, f} | w(f, e) + r(e) − r(f) = 0. |
| 2. {(f, e)}, {g, f, e} | t(c) = 7 > 6, q(c) = g. |
| 3. {(f, e), (g, c)}, {f, e} | r ← $r_I$. |
| 4. {(f, e), (g, c)}, {f, e} | w(f, c) + r(c) − r(f) = 0. |
| 5. {(f, e), (g, c), (f, c)}, {f, e, g, c} | w(e, d) + r(d) − r(e) = 0. |
| 6. {(f, e), (g, c), (f, c), (e, d)}, {f, e, g, c, d} | t(b) = 7 > 6, q(b) = f. |
| 7. {(g, c), (f, b)}, No positive I | r is optimal. |

It is noted that keeping every identified active constraint in A is not efficient since it might make |A| very large. On the other hand, if not careful, removing some active constraints from A may not lead to algorithm convergence, since it is possible to have active constraints cycling in and out of A. The method of the present invention successfully overcomes the difficulty by maintaining A as a regular forest, which is a forest as discussed below, wherein |A| is at most n−1 while the termination of the algorithm is guaranteed. Because the method incrementally handles dynamically generated constraints in a regular forest, which can not be done by any existing algorithm, the method of the present invention is much more efficient when it is expensive to generate all of the constraints.

Figure 3:
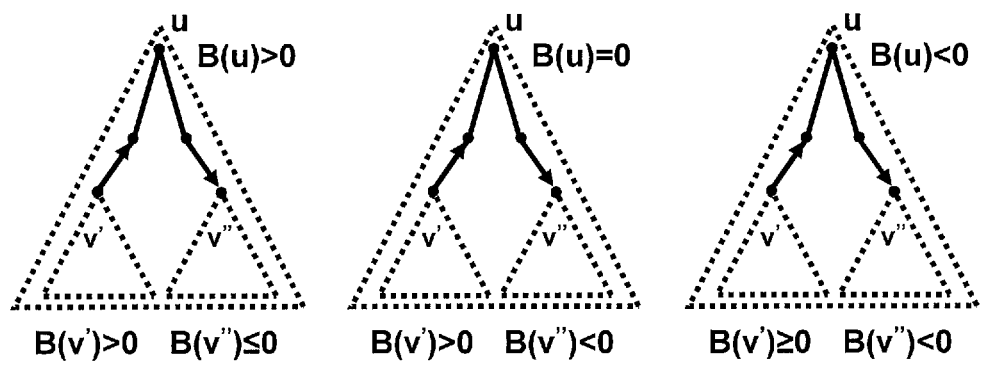
FIG. 3 is a diagram illustrating regular trees utilized in accordance with the present invention.

With regard to regular forests, a forest F with vertices V consists of rooted trees. For any vertex v ∈ V, let $T_v$ be the subtree rooted at v for any non-root vertex v ∈ V let $p_v$ be its parent. A labeling B: V→R is maintained such that B(v)=B($T_v$) For any non-root vertex v ∈ V, a direction is assigned to the edge {$p_v$, v} such that an active constraint can be derived from the edge. A labeling U(v) is used to maintain the direction: if U(v)=true, then (v, $p_v$) is the active constraint; and if U(v)=false, then {$p_v$, v} is the active constraint. Let A(F) be the set of the active constraints derived from the edges of F. A tree T is defined to be regular if for any vertex v of T that is not the root of T, the following conditions hold, which are illustrated in FIG. 3.

1. if b(T)>0, then (U(v) ∧ (B)(v)>0)) ∨ (¬U(v) ∧ (B(v)≤0));
2. if b(T)=0, then (U(v) ∧ (B)(v)>0)) ∨ (¬U(v) ∧ (B(v)<0));
3. if b(T)<0, then (U(v) ∧ (B)(v)≥0)) ∨ (¬U(v) ∧ (B(v)<0));

A tree is defined to be almost regular if the inequalities B(v) <0 and B(v)>0 in the above conditions are substituted with B(v)≤0 and B(v)≥0 respectively. Further, the forest F is defined to be regular if any tree T in the forest is regular.

A tree T is positive if b(T)>0. A tree T is respectively zero and negative if b(T)=0 and b(T)<0 respectively. Let P(F) be the set of all of the positive trees, Z(F) be the set of all of the zero trees and N(F) be the set of all of the negative trees in F. Let the vertices in P(F) be $V_{P(F)}$. If P(F)≠φ, then $I=V_{P(F)}$ is positive and closed under A(F).

Lemma states 1 and 2 are as follows.

LEMMA 1. Let I' be a vertex set that is closed under A(F) Then b(I')≤b(I) for $I=V_{P(F)}$.

On the other hand, if P(F)=φ, optimality can be claimed as in the following lemma.

LEMMA 2. Suppose that A(F) is a set of the active constraints of a feasible retiming r for the clock period φ, i.e., ∀(u, v)∈A(F), either $w_r$(u, v)=0, or (D(u, v)>φ)ˆ (r(v)+ W(u, v)−r(u)=1). If P(F)=φ, then r is the optimal solution of the min-area retiming problem.

The forest F is stored in an adjacency list data structure using O(n) storage. It is assumed that there are two operations that can be completed with O(n) time and space. The first one is CreateTree (F,v), which either removes the edge {pu, v} from the forest if v is not a root, or keeps F unchanged if v is a root. The second one is MergeTree (F, u, v), which assumes that v is the root of a tree not containing u and makes u the parent of v. The subroutine ChangeRoot (F,v) as show in FIG. 4 updates the regular forest F in order to make v the root of a tree without introducing additional active constraints into A(F). In each iteration of the For loop on line 2, $v_{i-1}$ is the root of the tree containing v, $v_i$ is a children of $v_{i-1}$, and v is the subtree rooted at $v_i$. The subtree rooted at $v_i$ is cut off from the tree rooted at $v_{i-1}$ on line 4. In order to keep the vertices of P(F), Z(F), and V(F) unchanged, $v_{i-1}$ is assigned to be a child of $v_i$ on line 7 if necessary. The correctness of the ChangeRoot subroutine is stated in the following lemma.

LEMMA 3. The invariants of the For loop on line 2 are that, first, the regular forest F is regular; second, A(F) contains no new active constraint; third, the vertices of P(F), Z(F), and N(F) are not changed. When the subroutine terminates, v is the root of a tree in E.

A forest with no edge may be designated as $F_0$. That is, every vertex is a tree in $F_0$. The method of FIG. 1 suggests that to start, the forest F is $F_0$ and P(F)=φ is eventually satisfied with additional active constraints.

Note that b(P(F))≥0 always holds and P(F)=φ is equivalent to b(P(F))=0. Intuitively, either a positive tree is combined with a negative tree to reduce b(P(F)), or a positive tree is combined with a zero tree in order to expand P(F) such that b(P(F)) can be reduced later. Such progress is captured by a potential tuple, $$\Psi(F) \triangleq (b(P(F)), n-|V_{P(F)}|),$$

with the lexicographic ordering, i.e., for Ψ (F)=(x,y) and Ψ (F')=(x', y'), Ψ(F')≤Ψ (F') if x<x' or (x=x') ∧ (y<y'). Assuming that the additional active constraint is (u, V) satisfying u ∈ $V_{P(F)}$ and v∉$V_{P(F)}$, the UpdateForest subroutine as shown in FIG. 5 will decrease Ψ(E) by adding (u, v) to A(F) and removing active constraints from A(F) if necessary. It is noted that such an active constraint must exist eventually as we move FFs from the fanouts of $V_{P(F)}$ to their fanins; otherwise the minimum area retiming problem is unbounded. In this subroutine, the problem is simplified by the ChangeRoot subroutine on line 1 in order to make v a root in the regular forest. If v is the root of a zero tree, v is assigned to be a child of u on line 3. Otherwise, the problem is simplified by ChangeRoot on line 5 in order to make u a root. Then v is assigned to be a child of u on line 7. Since after line 7, the tree rooted at u will not always be regular but will always be almost regular, the ZeroCut subroutine is called on line 8 to recover F as a regular forest.

The ZeroCut subroutine as shown in FIG. 6, recursively cuts off the subtrees that do not satisfy the conditions of a regular tree. The correctness of the ZeroCut and the UpdateForest subroutines are stated in the following lemmas:

LEMMA 4. Assume that every tree in F is regular except T which is almost regular. Let u be the root of T. Then after we apply ZeroCut(F, u, b(T)), F becomes regular and b(P(F)) remains unchanged.

LEMMA 5. Assume that F is a regular forest, u∈$V_{P(F)}$, and u∉ $V_{P(F)}$. Then after we apply UpdateForest(F,u,v), F remains a regular forest, Ψ(F) is strictly decreased, and (u,v) is the only active constraint added to A(F).

The method of FIG. 1 can be combined with subroutines of FIGS. 4, 5 and 6 to provide the incremental minimum area retiming method shown in FIG. 7. The invariants of the loop on line 3 of FIG. 7 are stated in the following lemma.

LEMMA 6. At the beginning of each iteration of the loop on line 3, r is a feasible retiming for φ, F is a regular forest, A(F) is the set of the active constraints of r.

The preconditions for lines 9 and 10 are established by the following lemma.

LEMMA 7 If $w_r$(u, v)≠0 for any fanout edge (u,v) of I, then $r_I$ is valid. If t(v)>φ in $r_I$ for some vertex v on line 9, then q(v) ∈ $V_{P(F)}$ and v ∉$V_{P(F)}$.

When optimality is not determined at line 6, either the FF area of r will be strictly decreased by b(I)>0 for some I ⊂ V and Ψ(F) remains the same on line 12, or Ψ(F) will be strictly decreased and the FF area of r remains the same on line 8 and 10 according to Lemma 5. Since the problem is bounded, the number of the subsets of V is finite, and the number of the regular forests with vertices V is finite, we can terminate the method where r in an optimal solution of the minimum area re-timing problem. Together with Lemma 2 and 6, we have the following theorem, THEOREM 1. The method of FIG. 7 will terminate and when it terminates, r is an optimal solution of the min-area retiming problem.

The method of FIG. 7 requires 0(m) storage for the circuit graph and 0(n) storage for the auxiliary data structures. The time complexity of each iteration of the loop on line 3 is O(m). The number of iterations can be bounded for reasonable practical VLSI circuits as stated in the following theorem, THEOREM 2. The space complexity of the method of FIG. 7 is 0(m). If the labeling b is assumed to be an integer-value; that the FF area in the initial feasible retiming is bounded by 0(m) and that b(P(Fo))=$\Sigma_{(v \in V \wedge (b(v)>o)} b(v)$ is bounded by 0(n), then the time complexity of the method of FIG. 7 is O(n²m).

It is noted that it is not necessary to generate I on line 4 of FIG. 7 from scratch every time. It can be proved that the UpdateForest subroutine changes $V_{P(F)}$ by either inserting vertices or removing vertices but not both. The UpdateForest subroutine can be modified to provide such information so that I can be constructed to be $V_{P(F)}$ incrementally. Let the inserted vertices or the removed vertices be Q. They will be used later when the constraints on line 7 and 9 are checked incrementally.

It is also not efficient to check every fanout edge of I, to compute the labelings t and q in $r_I$, and to check every vertex every time when the algorithm reaches line 7 and 9. The constraints should be checked incrementally, i.e. the constraints that are known to hold should be excluded from being checked, and the labelings t and q should be updated incrementally. Two vertex queues I and K are maintained for such purpose. For any vertex $u \notin J$, if $u \in I$, then for any edge (u, v), either $v \notin I$, or $w_r(u,v)>0$. For any vertex $u \notin K$ and any vertex v in the combinational fanin cone of u (including i) in $r_f$, t(v) and q(v) are up-to-date, and $t(v) \geq \phi$. On line 7, a vertex u is repeatedly removed from J until an edge (u,v) leaving, I satisfying $w_r(u,v)=0$ is found or J is empty. On line 9 of FIG. 7, the method repeatedly removes a vertex and its combinational fanin cone from K and computes t(v) and q(v) for any vertex v in the cone, until $t(v)>\phi$ for some vertex v or K is empty. The queues J and K are updated incrementally when I is changed. When I is changed by inserting the vertex set Q, it is sufficient to insert every vertex in Q to J and to insert every vertex in the combinational fanout cone of Q in $r_f$ to K. Computing the cone can be time consuming when |Q| is large. In such case every vertex of G is inserted into K. When I is changed by removing the vertex set Q, it is sufficient to insert to J the vertices $u \in I$ that fanouts to a vertex $v \in Q$ satisfying $w_r(u,v)=0$. Identifying such vertices could be inefficient when |Q| is large. In such case, every vertex of G is inserted to J. For the queue K, every vertex of G is inserted to it.

If the sharing of the FFs at the fanouts of gates is considered, redundant constraints can be introduced to PO. Let u be any vertex with the dummy vertex $u_m$ and let v be a fanout of u. In PO(r), we should have $w(u,v)+r(v)-r(u) \geq 0$ and wmax (u)−w(u, v)+7 $(u_m)-r(v) \geq 0$. Thus, wmax(u)+r $(u_m)$−r (u)$\geq 0$. This redundant constraint is inserted to PO and is checked first on line 7 after u is removed from the vertex queue J. The effect is that when both (u, v) and (v, $u_m$) are active constraints, (u, $u_m$) are directly identified as an active constraint and thus u and $u_m$ are included in one regular tree without requiring a detour to v. As b(u)>0 and b(u)+b($u_m$)=0 for most u, b(P(F)) is reduced more frequently without the necessity to expand P(F) first and the method runs faster.

The retiming method of the present invention has been found to be substantially faster than prior methods and it uses considerably less memory. Moreover, because the method is incremental, it can be stopped at any time that the circuit designer is satisfied with the register/FF area or number of registers/FFs.

Many further modifications and variations of the present invention are possible in light of the above teachings. Thus, it is to be understood that, within the scope of the appended claims, the invention may be practiced otherwise than are described here in above.

What is claimed is:

1. A method of relocating registers in a circuit design to reconfigure a circuit without changing a clock period, comprising:
   iteratively generating, by a processor that is operatively coupled to a memory, constraints related to the relocation of registers in the circuit design to form a set of constraints;
   maintaining, by the processor, the constraints as a regular forest so that the processor requests, from the memory, linear storage requirements in addition to storage requirements for a circuit graph;
   incrementally relocating, by the processor, registers in the circuit design to reduce the number of registers in the circuit design while maintaining a fixed clock period, wherein the relocation of registers is based at least in part on the constraints; and
   using the circuit design changed by relocating the registers to make an optimized circuit without changing the clock period.

2. The method of relocating registers in a circuit design as recited in claim 1, wherein the registers are flip flops.

3. The method of relocating registers in a circuit design as recited in claim 1, including determining whether there is a cluster of gates in the circuit wherein each gate of the cluster has a number of fanouts that is greater than the number of fanins of the gate and relocating the registers by iteratively moving a register over the cluster.

4. The method of relocating registers in a circuit design as recited in claim 1, wherein the forest is stored as an adjacency list data structure.

5. The method of relocating registers in a circuit design as recited in claim 1 including
   representing the circuit as the circuit graph with a plurality of vertices representing
   gates and a plurality of edges representing signals between vertices; and
   updating the regular forest to make a vertex a root of a tree without generating a constraint.

6. The method of relocating registers in a circuit design as recited in claim 5, including cutting off a subtree if the subtree is not a regular forest.

7. The method of relocating registers in a circuit design as recited in claim 1, wherein a constraint is generated when an increase in the number of registers moved over a path extends the path to be longer than a given clock period.

8. The method of relocating registers in a circuit design as recited in claim 1, wherein a constraint is generated only if it is directed to a path in the circuit that can lead to a reduction in the area of registers and/or number of registers in the circuit.

9. The method of relocating registers in a circuit design as recited in claim 1, including dynamically updating gate arrival times and comparing the gate arrival times to a given clock period.

10. The method of claim 1, wherein incrementally relocating the registers comprises moving the registers backwards over gates with fanouts larger than fanins.

11. The method of claim 1, wherein maintaining the constraints as a regular forest reduces a set of active constraints stored in the memory.

12. The method of claim 1, wherein the set of active constraints does not include every identified active constraint.

13. The method of claim 1, wherein the regular forest is used to handle incrementally dynamically generated constraints.

14. The method of claim 1, comprising:
   updating the regular forest as a function of a first vertex that belongs to a set of positive trees, a second vertex that does not belong to the set of positive trees, and at least some of the constraints of the regular forest.

15. The method of claim 1, comprising:
   removing an edge from the regular forest if a vertex of a tree or a subtree is not a root.

16. A method of relocating flip flops in a circuit design to adapt a circuit without changing a clock period, comprising:
   dynamically, by a processor that is operatively coupled to a memory, generating timing constraints;
   maintaining, by the processor, the dynamically generated timing constraints as regular forest so that the processor requests, from the memory, linear storage requirements in addition to storage requirements for a circuit graph;
   incrementally retiming, by the processor, the circuit design to reduce the number of flip flops in the circuit while maintaining a fixed clock period, wherein the retiming of the circuit design is based at least in part on the constraints; and using the retimed circuit design to make an optimized circuit without changing the clock period.

17. The method of relocating flip flops in a circuit design as recited in claim 16, including determining whether there is a cluster of gates in the circuit wherein each gate of the cluster has a number of fanouts that is greater than the number of fanins of the gate and relocating flip flops by iteratively moving a flip flop over the cluster.

18. The method of relocating flip flops in a circuit design as recited in claim 16, wherein the absolute value of the number of constraints in the set maintained as a forest is at most n−1 where n is the number of vertices in the circuit when represented as a circuit graph.

19. The method of relocating flip flops in a circuit design as recited in claim 18, wherein the vertices in the circuit graph represent combinational gates in the circuit.

20. The method of relocating flip flops in a circuit design as recited in claim 16, including dynamically updating gate arrival times and comparing the gate arrival times to a given clock period.

21. The method of relocating flip flops in a circuit design as recited in claim 16, wherein a timing constraint is generated when an increase in the number of flip flops moved over a path extends the path to be longer than a given clock period.

22. The method of relocating flip flops in a circuit design as recited in claim 16, wherein a timing constraint is generated only if it is directed to a path in the circuit that can lead to a reduction in the flip flop area and/or number of flip flops in the circuit.

23. A method of relocating registers in a circuit design to adapt a circuit without changing a clock period, comprising:

dynamically generating, by a processor that is operatively coupled to a memory, constraints related to the relocation of registers in the circuit design to form a set of constraints, wherein a constraint is generated only if it is directed to a path in the circuit design that can lead to a reduction in the number of registers in the circuit design;

maintaining, by the processor, the constraints as a regular forest so that the processor requests, from the memory, linear storage requirements in addition to storage requirements for a circuit graph;

incrementally relocating, by the processor, registers in the circuit to reduce the number of registers in the circuit design while maintaining a fixed clock period, wherein the relocation of registers is based at least in part on the constraints; and using the circuit design changed by relocating the registers to make an optimized circuit without changing the clock period.

24. The method of claim 23, wherein the registers are flip flops.

25. The method of claim 23, including determining whether there is a cluster of gates in the circuit wherein each gate of the cluster has a number of fanouts that is greater than the number of fanins of the gate and relocating the registers by iteratively moving a register over the cluster.

26. The method of claim 23, wherein a constraint is generated when an increase in the number of registers moved over a path extends the path to be longer than a given clock period.

* * * * *